United States Patent
Grossetête et al.

(10) Patent No.: US 12,236,007 B2
(45) Date of Patent: Feb. 25, 2025

(54) HEAD WORN DISPLAY DEVICE FOR DISPLAYING AN IMAGE BASED ON MULTIPLE PROJECTION REFERENCE FRAMES AND ASSOCIATED DISPLAY METHOD

(71) Applicant: THALES, Courbevoie (FR)

(72) Inventors: Matthieu Grossetête, Mérignac (FR); Jean-Michel Francois, Mérignac (FR); Laurent Bignolles, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/455,352

(22) Filed: Nov. 17, 2021

(65) Prior Publication Data
US 2022/0155852 A1  May 19, 2022

(30) Foreign Application Priority Data
Nov. 18, 2020 (FR) ..................... 20 11819

(51) Int. Cl.
*G06F 3/01* (2006.01)
*G02B 27/01* (2006.01)
*G09G 3/00* (2006.01)

(52) U.S. Cl.
CPC ......... *G06F 3/012* (2013.01); *G02B 27/0172* (2013.01); *G02B 27/0179* (2013.01);
(Continued)

(58) Field of Classification Search
CPC . G06F 3/01; G06F 3/011; G06F 3/012; G06F 3/013; G09G 3/002; G09G 3/02; G09G 3/025; G09G 2320/0626; G09G 2320/066; G09G 2340/10–14; G09G 2352/00; G09G 2354/00; G09G 2360/06;
(Continued)

(56) References Cited

U.S. PATENT DOCUMENTS 5,394,517 A * 2/1995 Kalawsky ............ H04N 13/344
                                                      348/E13.004
9,244,275 B1 * 1/2016 Li .......................... G02B 27/01
(Continued)

FOREIGN PATENT DOCUMENTS

WO    WO 2019/102483 A1    5/2019

OTHER PUBLICATIONS

French Search Report, from the French Patent Office in counterpart French Application No. 2011819, dated Jul. 14, 2021.

*Primary Examiner* — Keith L Crawley
(74) *Attorney, Agent, or Firm* — ArentFox Schiff LLP

(57) ABSTRACT

A head-worn display device carried for displaying an image in accordance with at least two projection reference frames, including an image acquisition module configured to separately acquire an image stream for each of the at least two projection reference frames and/or to extract from a single input stream an image stream for each of the at least two projection reference frames. The head-worn display device also includes a spatial processing module configured to adapt the corresponding image stream to a display reference frame for each projection reference frame, a mixing module configured to generate a resulting stream, and a projection module configured to project the resulting stream onto a display surface in accordance with the display reference frame.

9 Claims, 2 Drawing Sheets

(52) U.S. Cl.
CPC ...... *G09G 3/002* (2013.01); *G02B 2027/0118* (2013.01); *G02B 2027/014* (2013.01); *G02B 2027/0187* (2013.01); *G09G 2320/0626* (2013.01); *G09G 2320/066* (2013.01); *G09G 2340/10* (2013.01); *G09G 2354/00* (2013.01); *G09G 2380/12* (2013.01)

(58) Field of Classification Search
CPC ......... G09G 2370/04; G09G 2370/045; G09G 2370/10; G09G 2380/12; G02B 27/0093; G02B 27/01; G02B 27/0101; G02B 27/017; G02B 27/0172; G02B 27/0179; G02B 27/0189; G02B 2027/0118; G02B 2027/0132–0141; G02B 2027/0181–0187; G01C 23/005; H04N 13/111–122; H04N 13/156; H04N 13/183; H04N 13/361; H04N 13/366; H04N 13/373–383; G06T 19/003; G06T 19/006

See application file for complete search history.

(56) References Cited

U.S. PATENT DOCUMENTS

| | | | |
|---|---|---|---|
| 10,308,371 B1* | 6/2019 | Tiana | G08G 5/0021 |
| 2004/0169617 A1* | 9/2004 | Yelton | G06T 15/005 |
| | | | 345/1.1 |
| 2010/0231705 A1 | 9/2010 | Yahav et al. | |
| 2012/0162248 A1* | 6/2012 | Francois | G02B 27/017 |
| | | | 345/620 |
| 2012/0224062 A1* | 9/2012 | Lacoste | G09G 5/14 |
| | | | 348/148 |
| 2015/0360612 A1* | 12/2015 | Lee | B60R 1/00 |
| | | | 348/148 |
| 2016/0005319 A1 | 1/2016 | Cros et al. | |
| 2016/0264255 A1* | 9/2016 | Connor | H04N 5/247 |
| 2017/0330381 A1 | 11/2017 | Wright et al. | |
| 2019/0197995 A1* | 6/2019 | Ganille | G06F 3/011 |
| 2020/0285056 A1* | 9/2020 | Linde | G06F 3/012 |
| 2020/0379253 A1* | 12/2020 | Hasharoni | G02B 27/0172 |
| 2021/0065653 A1* | 3/2021 | Keith | G09G 3/2088 |
| 2021/0089119 A1* | 3/2021 | Riguer | H04N 19/167 |

* cited by examiner

HEAD WORN DISPLAY DEVICE FOR DISPLAYING AN IMAGE BASED ON MULTIPLE PROJECTION REFERENCE FRAMES AND ASSOCIATED DISPLAY METHOD

CROSS-REFERENCE TO RELATED APPLICATIONS

This application claims priority to French Application No. 20 11819, filed on Nov. 18, 2020. The disclosure of the priority application is incorporated in its' entirety herein by reference.

FIELD OF THE INVENTION

The present invention relates to a head-worn display device.

The present invention also relates to a display method associated with this display device.

The field of the invention lies in the area of head-worn projection of information or images.

In particular, the invention is still applicable to so-called head-worn display devices, which are also known as "Head-Up Displays" and "Helmet Mounted Displays".

BACKGROUND OF THE INVENTION

In a manner known per se, wearable head-worn displays allow for a display surface that is "worn" by the user, i.e. integrated into the helmet, glasses or any other device that mechanically links the movement of the display surface to the movement of the user.

The effect of image conformity is achieved by superimposing the display surface with reality.

Also known per se, such devices commonly incorporate a function to detect the posture of the user in order to be able to adapt the projection of information according to different projection reference frames.

Thus, for example, when the head-worn display device is used in a carrier such as an aircraft, it is possible to associate a projection reference frame linked to the external environment of the aircraft and another projection reference frame linked, for example, to the display surface or the user's head.

Displaying information in different reference frames in the case of a head-worn display device makes it possible, for example, to display information by symbols whose representation is linked to a specific reference frame (e.g. representation in the head-worn display device of the horizon line belonging to the local terrestrial reference frame by drawing a synthetic line) and to adapt the density of information perceived by the user according to their head position in relation to the geometry of the carrier and to the operational needs. Some information can thus be displayed permanently in the user's field of view, others can be displayed only in the carrier's line of sight, for example depending on the criticality of the information in relation to the need.

It is therefore clear that head-worn display devices can combine images from different projection reference frames.

In the state of the art, for implementing the projection of images conforming to at least two distinct projection reference frames by head-worn display devices, several methods are known.

Thus, according to some of these methods, the head-worn display device includes all of the graphics generation logic and mixes the images relative to the different projection reference frames.

However, in such a case, the head-worn display device depends on its application and must be modified for each new application.

Similar head-worn display devices are also known to include a system of graphical and logical tools that allow an external client to adapt the symbology and input/output data for their application.

However, for this type of device, the complexity and cost associated with the certification of the tool system is additional to that of the product itself. Furthermore, the adaptability of external applications also depends on the performance of the tools offered.

The same type of head-worn display device can also provide dedicated programming interfaces for the development of external applications. These interfaces, known as "APIs" (Application Programming Interfaces), make it possible to receive graphic generation commands in a given projection reference frame using, for example, an Internet or Data Link connection.

This type of device also has disadvantages related to the complexity and cost associated with setting up and certifying the programming interfaces on the device side and on the external equipment side to respect the programming surface.

In yet other methods known to the state of the art, the head-worn display devices only allow the simple display of an image with associated controls. The generating of the image is done upstream by equipment external to this device.

However, in such a case, significant latencies may occur when, for example, it is necessary for the external equipment to acquire user head posture detection data from the head-worn display device. This type of device therefore no longer meets real-time needs.

SUMMARY OF THE INVENTION

The present invention aims to overcome the above drawbacks and in particular to provide a head-worn display device that allows external customers to develop applications easily while meeting the real-time constraints of this device.

To this end, the invention relates to a head-worn display devices for displaying an image in accordance with at least two projection reference frames, the device.

This device comprises an image acquisition module configured to separately acquire an image stream for each of at least two projection reference frames and/or to extract from a single input stream an image stream for each of at least two projection reference frames; for each projection reference frame, a spatial processing module configured to adapt the image stream corresponding to that projection reference frame to a display reference frame; a mixing module configured to generate a resulting stream comprising the image stream adapted by each of the spatial processing modules; and a projection module configured to project the resulting stream onto a display surface according to the display reference frame.

In other beneficial aspects of the invention, the device according the invention comprises one or more of the following features, taken in isolation or in any technically possible combination:

the image acquisition module comprises at least one element selected from the list of elements consisting of a dedicated image input for at least one projection reference frame; a common image input with a filtering unit for distinguishing image streams relating to at least two different projection reference frames, and a common image input of the multi-colour type with each colour carrying information about a projection reference frame;

the device comprising a detection module configured to detect a head posture of a user, at least one processing module being capable of adapting the corresponding image stream according to the head posture detected by the detection module;

the device being a head-worn display device embedded in a carrier;

the device comprising an attitude acquisition module configured to acquire attitudes of the carrier, at least one processing module being capable of adapting the corresponding image stream as a function of the attitudes of the carrier acquired by the attitude acquisition module;

each projection reference frame is chosen from the group consisting of:
 a reference frame related to the display surface;
 a reference frame linked to a user's body;
 a reference frame linked to the holder;
 a reference frame linked to the carrier's external environment;

the device comprising a module for controlling the brightness and/or contrast of the resulting stream;

the image acquisition module is further configured to acquire priority control information of the different projection reference frames;

the mixing module is configured to generate the resulting stream based on said priority control information;

said priority control information is encoded in pixels of the corresponding image streams.

The present invention also relates to a method of head-worn display of an image conforming to at least two projection reference frames, the method comprising the following steps:

separately acquiring an image stream for each of at least two projection reference frames and/or extracting from a single input stream an image stream for each of at least two projection reference frames;

for each projection reference frame, adapting the image stream corresponding to that projection reference frame to a display reference frame;

generating a resulting stream comprising the adapted image streams;

projecting the resulting flow onto a display surface according to the display reference frame.

BRIEF DESCRIPTION OF THE DRAWINGS

Characteristics and advantages of the invention will become apparent upon reading the following description, given only as a nonlimiting example, referring to the attached drawings, in which.

DETAILED DESCRIPTION OF THE INVENTION

Figure 1:
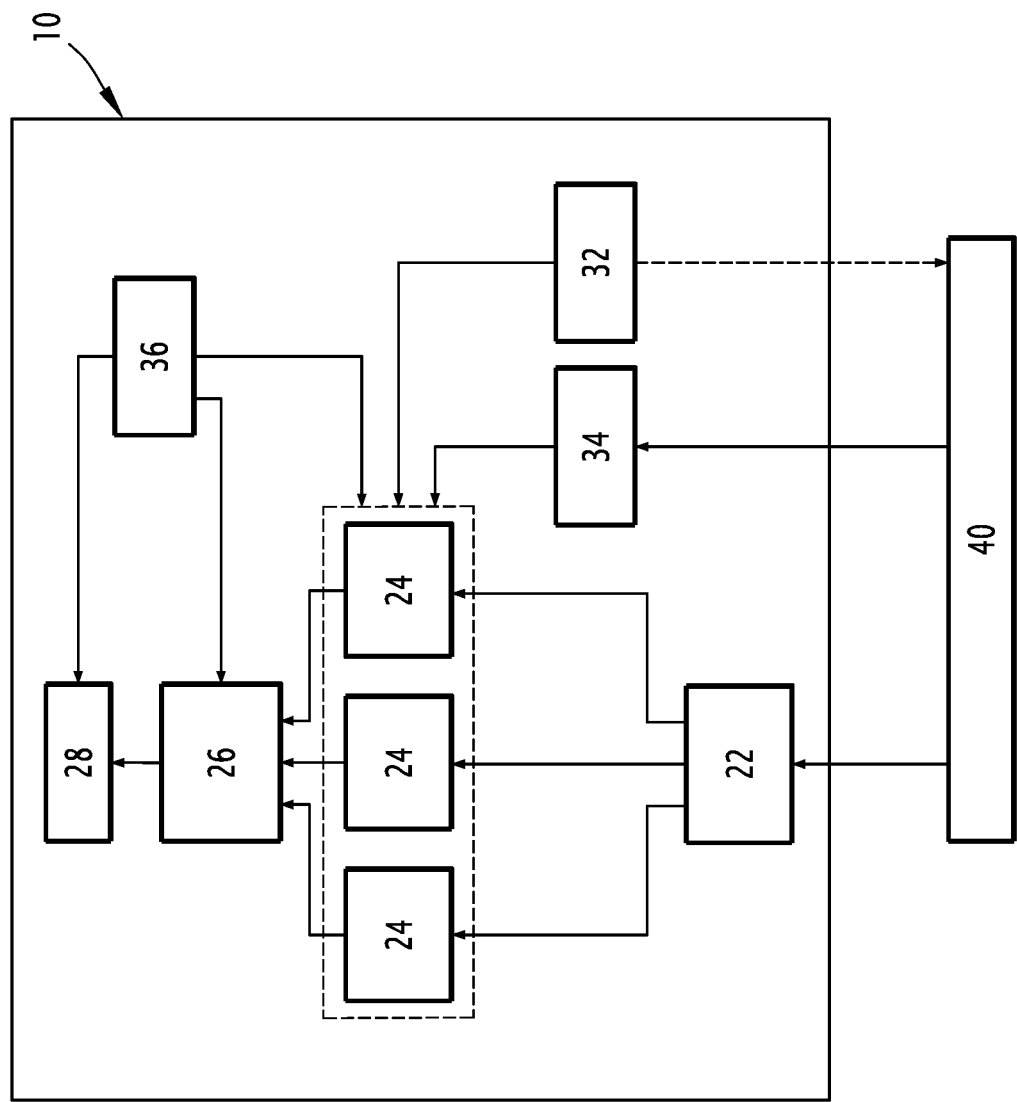
FIG. 1 is a schematic view of a head-worn display device according to the invention.

The display device 10 in FIG. 1 allows images to be displayed according to at least two different projection reference frames.

This display device 10 is a head-worn display device.

This type of display is also known as a "Head-Up Display" or "Helmet Mounted Display".

In a manner known per se, this type of display device is intended to be worn by a user and is, for example, in the form of a helmet or glasses. In such a case, this display device 10 defines a display surface on which the projection is made.

The display surface is, for example, the visor in the case of a helmet or the transparent surface of the associated glasses, and defines a display reference frame According to the invention, the display device 10 is intended for use in a carrier such as an aircraft.

In this case, the user of the display device 10 is an occupant of this aircraft (pilot, co-pilot, $3^{rd}$ man, cargo operator, etc.).

In other examples of the invention, the display device 10 is carried in any other carrier, such as a marine vehicle or a land vehicle.

As mentioned earlier, the display device 10 allows images to be displayed that conform to at least two projection reference frames.

Figure 2:
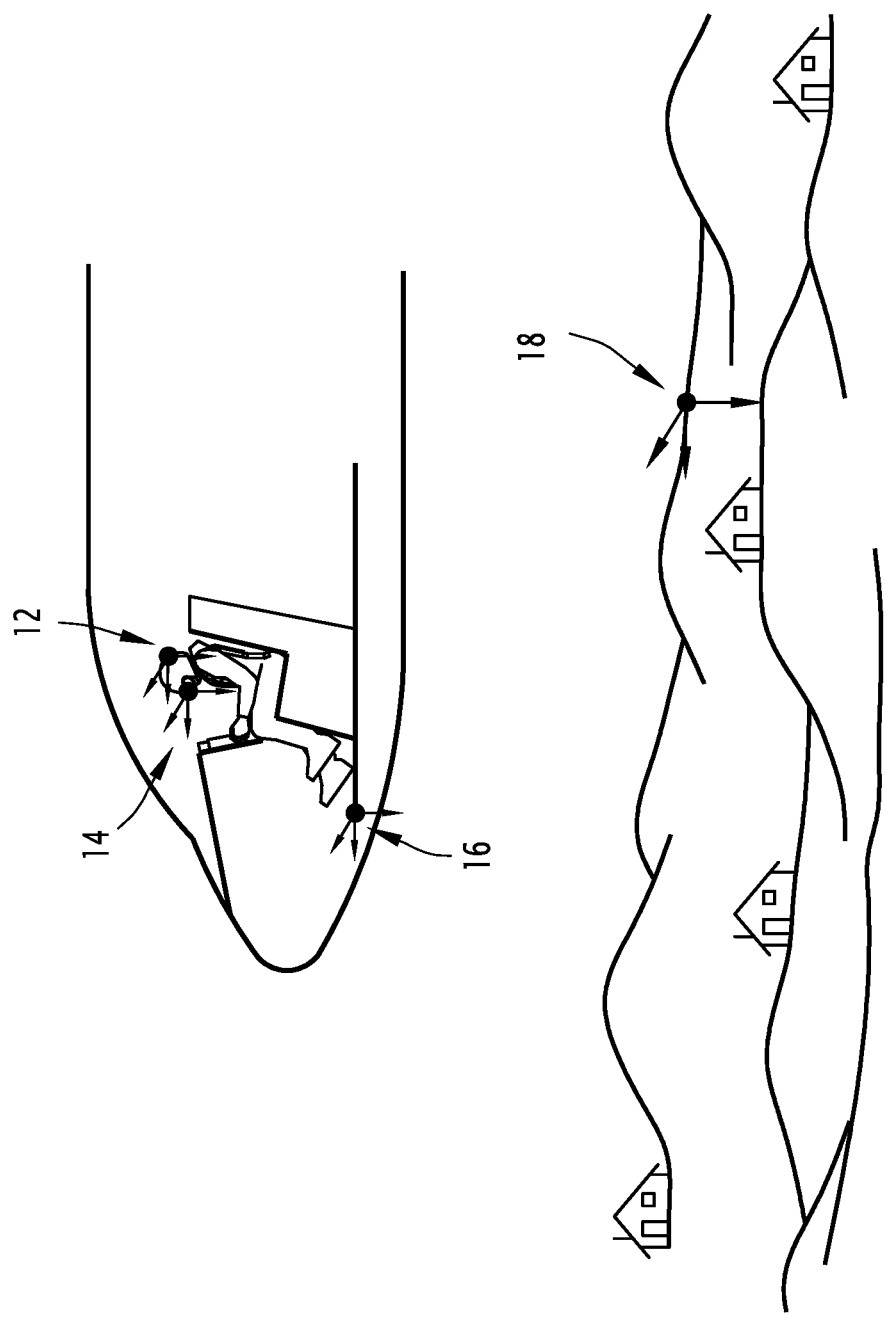
FIG. 2 is a schematic view of different projection reference frames for which the head-worn display device shown in FIG. 1 remains applicable.

These different projection reference frames are illustrated schematically in FIG. 2 for the case of an aircraft.

Thus, as can be seen in FIG. 2, each projection reference frame is chosen in relation to an object inside or outside the carrier.

In FIG. 2, the projection reference frame 12 is related to the user's body, in particular their head. This type of reference frame is known in the state of the art as a "b-frame".

In the same FIG. 2, the projection reference frame 14 is linked to the display surface which shows the visor of the user's helmet in this example. This type of reference frame is known in the state of the art as a "d-frame".

The projection reference frame 16 has a reference frame related to the carrier and the projection reference frame 18 has a reference frame related to the external environment of the carrier, for example the ground in the case of an aircraft. These types of reference frame are known in the state of the art as "p-frame" and "i-frame" respectively.

It is therefore clear that these different projection reference frames can be used to represent different types of information in head-worn displays that the user can use to control the carrier.

The display provided by the display device 10 therefore has a display that conforms to all of these projection reference frames.

With reference to FIG. 1, the display device 10 comprises an image acquisition module 22, a plurality of spatial processing modules 24, a mixing module 26 and a projection module 28.

Optionally, the display device 10 further comprises a detection module 32, an attitude acquisition module 34 and a control module 36.

Among these optional modules, the sensing module 32 can detect the posture of the user's head or the position of any other part of the user's body that can be used as a reference point.

Alternatively, the detection module 32 can detect the position and/or attitude of any other movable reference frame with respect to the projection reference frame 16 linked to the carrier.

The attitude acquisition module 34 allows the acquisition of the carrier's attitudes. These attitudes are for example provided by an internal system of the carrier such as a per se known inertial unit.

The control module 36 can, for example, adjust the brightness and/or contrast of the image displayed on the display surface.

The image acquisition module 22 acquires image streams from a plurality of external systems designated in FIG. 1 by the numerical reference 40.

In particular, these external systems 40 allow for separate image streams for at least two projection reference frames and/or a single image stream for at least two different projection reference frames.

The image acquisition module 22 can then separately acquire each image stream provided by the system 40 and/or extract from a single input stream an image stream for each projection reference frame.

For this purpose, the image acquisition module 22 has, for example, a dedicated image input for each projection reference frame whose image stream is transmitted separately and/or a single image input for the single image stream.

In the latter case, the single image input is associated with, for example, a filter unit to distinguish between image streams relating to different projection reference frames. In this case, the filtering unit has for example filtering capabilities by a set of bits per pixel to identify the corresponding projection reference frame, the number of dedicated bits being a function of the number of projection reference frames used.

Alternatively, the single image input has a multi-colour (e.g. RGB) input with each colour carrying information about a given projection reference frame.

Alternatively, the single image input is a combination of the above different types of inputs.

According to one example, the image acquisition module 22 also allows the acquisition of priority control information for the various reference systems. This control information relates to the graphic overlay priority of the corresponding image streams and can be given by the external systems 40:
- either by static configuration linked to a priority for each reference frame;
- or by pixels of the incoming image (coding with a number of bits dedicated to priority).

It is clear that the priority of each reference frame can be determined, for example, by the importance of that reference frame for the piloting of the aircraft and thus plays an important role in its safety. The priorities of different reference frames can for example be predetermined by the external systems 40, for example at the time of their design. In addition, as mentioned earlier, the priorities of different reference frames may correspond to the graphic overlay priorities of the image streams from the corresponding reference frames.

The number of spatial processing modules 24 is chosen according to the number of projection reference frames for which the display device 10 is designed. In particular, a spatial processing module 24 is associated with each projection reference frame for which the display device 10 is designed.

In the example shown in FIG. 1, there are three spatial processing modules 24.

Each spatial processing module 24 is configured to adapt the image stream corresponding to that processing module 24 to the display reference frame of the display surface.

In particular, each spatial processing module 24 is configured to apply a projection function to each pixel of the received image stream on the display surface.

For this purpose, at least some of the spatial processing modules 24 use additional data relating to the corresponding projection reference frame.

Thus, for example, the spatial processing module 24 relating to the carrier-related projection reference frame, uses data from the detection module 32 describing the posture of the user's head in the carrier-related reference frame.

In a similar way, the spatial processing module 24 relating to the reference frame linked to the carrier's external environment, uses the data from the detection module 32 describing the posture of the user's head as well as the data relating to the carrier's attitudes from the attitude acquisition module 34.

Of course, depending on the projection reference frame used, the spatial processing modules 24 may use other data from external systems 40 or from other modules integrated into the display system 10.

The mixing module 26 generates a resulting stream from the image streams adapted by each of the spatial processing modules 24.

In particular, the mixing module 26 is used to combine the set of adapted images for subsequent display on the display surface according to the display reference frame.

In addition, in the event that priority control information has been acquired, the mixing module 26 allows the images to be combined in accordance with this priority control information, in particular with regard to the superposition of images from different streams.

Finally, the projection module 28 is used to project the resulting stream obtained by the mixing module 26 onto the display surface.

The head-worn display method implemented by the display device 10 will now be explained.

Initially, it is assumed that the external systems 40 provide separate image streams for at least two different projection reference frames and/or a single image stream comprising at least two separate image streams.

In a first step, the image acquisition module 22 separately acquires an image stream for each corresponding projection reference frame and/or extracts from the single input stream an image stream for each of the projection reference frames.

The image acquisition module 22 then provides these image streams to the corresponding spatial processing module 24.

In a subsequent step, each of the spatial processing modules 24 adapts the corresponding image stream for display in the display reference frame.

As mentioned earlier, at least some of these spatial processing modules 24 use data provided by modules 32 and 34 relating to the user's head posture or the carrier's attitudes respectively.

In a subsequent step, the mixing module 26 generates a resulting stream comprising the image stream adapted by each of the spatial processing modules 24.

In a subsequent final step, the projection module 28 then projects the resulting stream obtained by the mixing module 26 onto the projection surfaces according to the display reference frame.

If necessary, the control module 36 controls the brightness or contrast of the resulting projected image.

It is therefore clear that the present invention has a number of advantages.

In particular, the invention provides a single, standardised interface for image streams relating to different projection reference frames.

Thus, external systems can directly provide such an image stream independently of the internal processing performed by the display device according to the invention.

Moreover, the display device according to the invention corresponds to real time constraints because it integrates all the devices necessary for its operation.

The invention claimed is:

1. A method of head-worn displaying an image in accordance with at least two different projection reference frames, each projection reference frame being chosen in relation to an object inside or outside a carrier, the object being different for each projection reference frame and each object being in movement relative to each other object, the method comprising:
   extracting from a single image stream acquired from external systems including image sensors, an image stream for each of the at least two different projection reference frames;
   for each of the at least two different projection reference frames, adapting the image stream corresponding to that projection reference frame to a display frame using additional data relating to the corresponding projection reference frame, wherein the at least two different projection reference frames are different than the display frame;
   generating a resulting stream comprising the adapted image streams; and
   projecting the resulting stream onto a display surface defined by the display frame,
   wherein the single image stream is acquired via a common image input, the single image stream being filtered by a filter unit associated with the common image input to distinguish image streams relating to the at least two different projection reference frames.

2. A method of head-worn displaying an image in accordance with at least two different projection reference frames, each projection reference frame being chosen in relation to an object inside or outside a carrier, the object being different for each projection reference frame and each object being in movement relative to each other object, the method comprising:
   extracting from a single image stream acquired from external systems including image sensors, an image stream for each of the at least two different projection reference frames;
   for each of the at least two different projection reference frames, adapting the image stream corresponding to that projection reference frame to a display frame using additional data relating to the corresponding projection reference frame;
   generating a resulting stream comprising the adapted image streams; and
   projecting the resulting stream onto a display surface in accordance with the display frame, wherein the single image stream is acquired via a common image input in the form of a multi-color input, with each color of the multi-color input carrying information about one of the at least two projection reference frames.

3. The method of claim 1, wherein the filter unit has filtering capabilities by a set of bits per pixel to identify a corresponding projection reference frame, a number of dedicated bits being a function of a number of projection reference frames used.

4. The method according to claim 1, further comprising:
   detecting a head posture of a user; and
   adapting the corresponding image stream according to the detected head posture.

5. The method according to claim 1, further comprising:
   acquiring attitudes of the carrier; and
   adapting the corresponding image stream as a function of the acquired attitudes of the carrier.

6. The method according to claim 1, wherein each projection reference frame is selected from the group consisting of:
   a reference frame related to the display surface;
   a reference frame linked to a user's body;
   a reference frame linked to a holder;
   a reference frame linked to the carrier's external environment.

7. The method according to claim 1, further comprising controlling the brightness or contrast of the resulting stream.

8. The method according to claim 1, further comprising:
   acquiring priority control information of the different projection reference frames; and
   generating the resulting stream based on said priority control information.

9. The method according to claim 8, wherein said priority control information is encoded in pixels of the corresponding image streams.

* * * * *